April 10, 1956 — I. H. PAGE — 2,741,762
RADAR INDICATOR SYSTEM
Filed Feb. 5, 1946
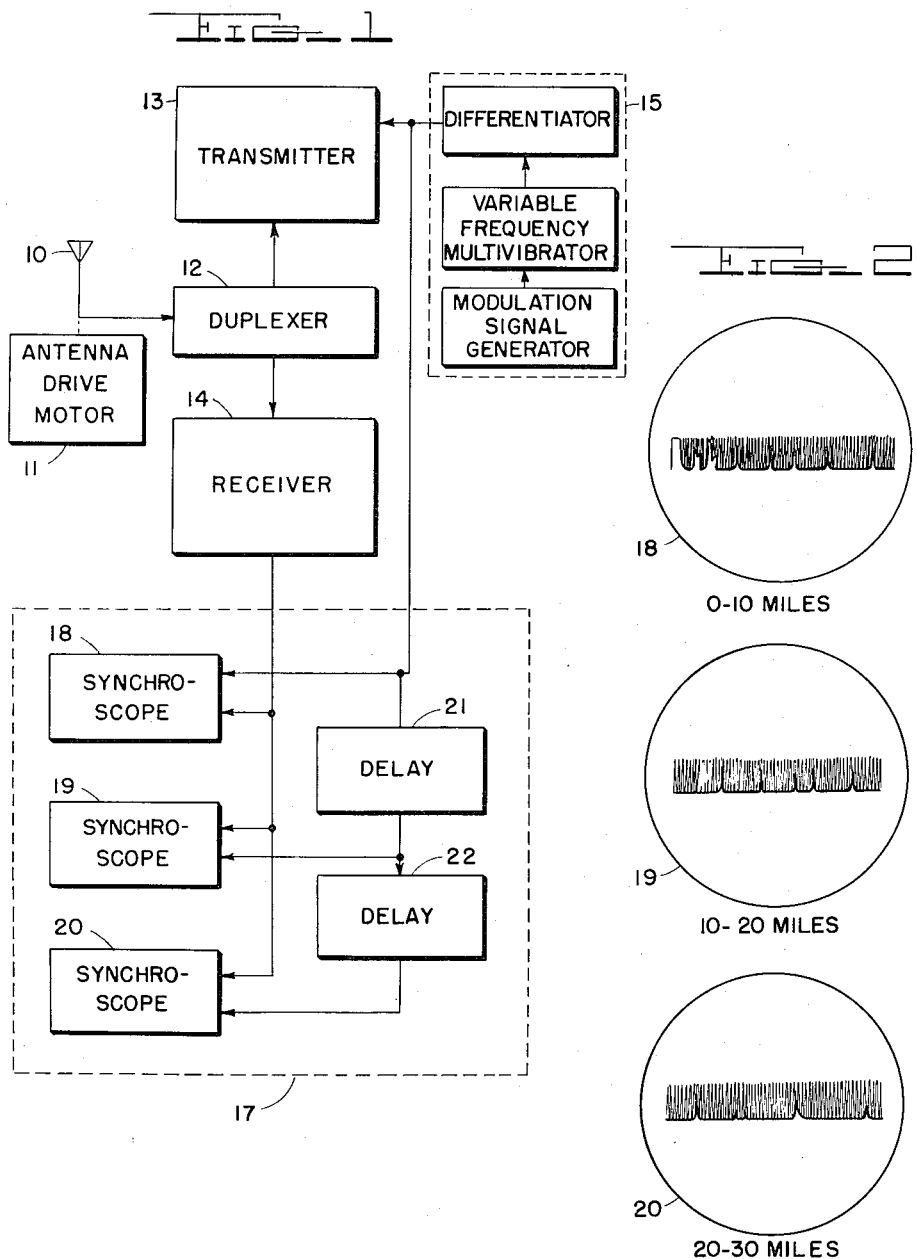
Inventor
IRVING H. PAGE United States Patent Office 2,741,762
Patented Apr. 10, 1956

2,741,762

RADAR INDICATOR SYSTEM

Irving H. Page, Washington, D. C.

Application February 5, 1946, Serial No. 645,691

7 Claims. (Cl. 343—13)

(Granted under Title 35, U. S. Code (1952), sec. 266)

This invention relates in general to radar systems, and more particularly to indicator and timing components of high pulse repetition frequency, rapid scan pulse radar systems.

Heretofore, the maximum range obtainable in pulse radar systems was limited, exclusive of power limitations, by the scanning frequency of the radar antenna, and the speed of propagation of the radar radiation signals in air. If the pulse repetition rate, hereafter referred to as the P. R. F., is too high, the return signal resulting from a given transmitted pulse may not return to the receiver until after the next following pulse is transmitted. Generally, the returned pulse cannot be identified with its corresponding transmitted pulse in this case, and ambiguity in range determination arises. Thus, with a high pulse repetition frequency, target echoes returning at a velocity equal approximately to that of light from long ranges would be received by the radar unit during a succeeding cycle of operation. Since the appearance on the face of the indicator of the long range or second cycle echoes is the same as that of the short range echoes displayed on the indicator time base, it is difficult to determine whether the echo represents targets at the true range indicated or echoes of radiations transmitted during a preceding cycle and reflected from a target at the range indicated on the time base plus the range equivalent of the time occupied by one or two cycles of operation of the radar system. This characteristic has heretofore limited the pulse repetition frequency of radar systems to a value which would produce a cycle of operation of sufficient time duration to permit the transmitted pulse radiation to travel at approximately the velocity of light to the target at the maximum range desired and return to the radar system during the period of one cycle of operation, i. e. to employ an interval between pulses that is longer than the time required for a pulse to travel over twice the distance corresponding to the maximum range sensitivity of the apparatus.

Although the pulse repetition rate must be kept low enough to realize the required maximum range, it must also be kept high enough to provide an advantageous integrating effect. If only one pulse were transmitted to and received from a given target, great difficulty would be experienced in taking advantage of this single pulse in determining the desired information with sufficient accuracy, and the reliability and obtainable range would be poor. Equipment is therefore designed in such a way that many pulses, say ten or more, are received from a single object. By this means, the effect of target fading on the indicator scope of the radar systems are somewhat reduced by the superposition of a plurality of target echoes.

Moreover, the rate of angular motion of the antenna in searching extensive regions must also be considered in determining the pulse repetition frequency. Clearly, if the antenna is moved through too great an angle between pulses, then not only will the number of pulses per target be too low, but there may even be regions in space in which targets may lie without being detected. In this connection, the sharpness of the antenna beam is another factor which materially determines the P. R. F. of the radar system.

Accordingly, it is an object of this invention to provide means for increasing the maximum effective range of a rapid scan radar system.

Another object of the invention is to provide an indicator system for a high P. R. F., rapid scan radar system with no maximum range limitation.

Another object of the invention is to provide an indicator system for a high P. R. F., rapid scan radar, adapted to obviate the velocity of radiated energy limitation on the P. R. F. or range of the radar system.

Another object of the invention is to provide a rapid scan radio echo ranging system having a high pulse repetition rate and having a plurality of indicators each covering a particular range segment whereby the maximum range may be extended by removal of the velocity of light limitation on existing rapid scan pulse radars.

Another object of the invention is to provide multiple indicators for a rapid scan radar system, each of the indicators adapted to display a particular range segment and sensitive to a particular transmitted pulse, to obviate the velocity of energy radiation limitations on the P. R. F. or range of the radar system.

Other objects, advantages, and capabilities of the invention will become apparent from the following description taken in conjunction with the accompanying drawings, showing only a preferred embodiment of the invention in which:

Fig. 1 is a block diagram of the radar system with the multiple indicator components forming the instant invention;

Fig. 2 is a sketch of the presentation produced on the faces of the indicators in the present invention.

Referring now to Fig. 1, showing the block diagram of the instant system, a highly directional transmitting and receiving antenna 10 is continuously driven by an antenna drive motor 11 at a high scanning speed in a horizontal plane to continuously scan the horizon or earth surface through 360° of arc in the proximity of the radar installation. The energy radiated or received by the directional antenna 10 is coupled through a switch or duplexer mechanism 12 alternately to the transmitter 13 and receiver 14. The transmitter 13 is designed to generate a series of short duration, high peak power, radio-frequency pulses at a pre-established repetition rate. The repetition rate of generation of these transmitter pulses is controlled by a timer or synchronizer 15 coupled with the transmitter 13 whereby the repetition frequency of the transmitter 13 is held equal to the frequency of trigger pulses generated in synchronizer 15. The frequency of the pulses generated by the synchronizer 15 may be modulated by any suitable means. In the embodiment shown, the synchronizer 15 comprises a modulation signal generator, such as a noise, saw tooth or sinusoidal voltage generator, coupled to the input of a variable frequency, free running multivibrator having a grid return to a potential controlled by the modulation voltage output of the modulation signal generator to control the period of oscillation of the multivibrator as a function of the output voltage waveform of the modulation signal generator, the variable frequency square wave output of the multivibrator being coupled through a differentiator stage to generate short duration pulses coincident with the leading and trailing edges of the multivibrator output waveform and thence to the stages to be controlled by the synchronizer. As is conventional practice in such radar systems, the high power, short duration transmitter radio-frequency pulses are coupled through the duplexer 12 to the directional antenna 10, by which the energy pulse is radiated in a directional antenna pattern into space. Any objects located in the proximity of the antenna 10 and within the beam path of radiation will reflect a small portion of this radiated energy back toward the directional antenna 10. The timing of the system is so controlled that after a pulse is generated by the transmitter 13 and radiated through the antenna 10, the receiver is rendered sensitive to any radiated energy picked up by the antenna 10 to detect this received energy and generate a video pulse coincident in time with the reception of the reflected energy in the antenna 10. This control of the duty cycle of the receiver 14 is effected by the duplexer mechanism 12, which renders the receiver 14 responsive to received radiations in the antenna 10 during the entire period when no pulse is being generated by the transmitter 13. Thus the time lapse between the generation of a particular transmitted pulse and the reception of the corresponding return signal, normally an echo, from the target intercepting the antenna radiation beam is directly proportional to the range of the target object from the transmitter installation. To indicate this time delay or time lapse between the transmitted and received pulses, is the function of the indicator generally designated by the reference character 17.

The indicator 17, shown herein as an exemplary embodiment of the invention, and not in a limiting sense thereof, consists of three synchroscopes 18, 19, and 20, each identical in construction and well-known in the art. These synchroscopes comprise an electrostatic deflection cathode ray tube, the necessary circuits for generating an electron beam within the tube, and internal sweep or time base generating circuits coupled to the horizontal deflection plate of the cathode ray tube. The sweeps are triggered in time coincidence with the generation of each radio-frequency pulse in the transmitter 13 to initiate a linear time base or horizontal sweep of the electron beam in the cathode ray tube whereby vertical deflections of the cathode electron beam subsequent to the initiation of the time base or horizontal sweep will be obvious and measurable by the horizontal distance between the origin of the time base and the position of the vertical deflection. The video output of the radar receiver 14 is coupled directly to the vertical deflection plate of the cathode ray tube whereby reception of any radiant energy echo by the antenna 10 and detection by the receiver 14 will produce a vertical deflection of the horizontal time base or sweep in proper time relation with the transmitted pulse.

The frequency modulated timing pulses generated by the synchronizer 15 are coupled to the indicator 17 where these pulses are fed directly to one of the synchroscopes 18, designated as the low range segment indicator, and through a delay circuit 21 to the scope 19 displaying the second range segment, and an identical delay circuit 22 to the synchroscope 20 displaying the third range segment, and so on, whereby the repetition rate timing pulses are delayed by integral multiples of a fixed delay time proportional to the equivalent range time of one cycle of operation. These delayed repetition rate timing pulses are coupled to a conventional sweep or time base generator circuit in the synchroscopes 18, 19, and 20, for initiating the sweep or time base voltage and thus the sweep of the electron beam on the face of the synchroscope. If, for example, the synchroscope 18 were designed to display a range segment of zero to 10 miles, the synchroscope 19 to display the range segments from 10 to 20 miles, and the synchroscope 20 to display the range segment from 20 to 30 miles, a delay of about 120 microseconds, that is, the time required for the transmitted pulse to travel from the antenna 10 to an object at the maximum range for any one segment and return to the antenna 10, must be provided for the timing pulses so that the initiation of the sweep or time base in the second synchroscope 19 will be delayed by 10 miles in range from the initiation of the synchroscope 18. Thus, for each 10 mile range segment display, a delay circuit, such as the delay circuits 21 and 22, must be inserted in the initiating pulse coupling to each synchroscope to delay the time base in each synchroscope by the proper equivalent range time. The delay circuit 21 and 22 may be in the form of an artificial transmission line or an asymmetrical or one-shot multivibrator, each of which is well known in the art.

If the repetition rate of this radar system were held constant, there would still be no way to distinguish between the pulses generated in different repetition cycles. The repetition rate of the radar system is held at a high value, thus providing a short period between pulses. This period may obviously be equal to or less than the range equivalent of one range sector displayed on the synchroscope and thus less than the delay generated in either of the delay circuit 21 and 22. Consequently, due to the delay of the trigger pulse to synchroscope 19 associated with a given transmitter pulse, the synchroscope 19 may be generating a time base for measuring the second range sector while the transmitter has generated a subsequent pulse. Since the video output of the receiver is coupled to all of the synchroscopes, the echoes of targets in the zero to 10 mile range or the first range segment would be displayed on the indicator of the synchroscope 19 simultaneously with echoes returning from the 10 to 20 mile range from the preceding radiated pulse. Likewise, echoes of targets in the third range segment or 20 to 30 miles range segment would be presented on the indicator of the third segment of the synchroscope 20 simultaneously with echoes returning from the two preceding transmitter pulses, thus echoes of targets 10 to 20, and zero to 10 mile ranges. However, by frequency modulating the synchronizer 15 with either a sawtooth, sinusoidal or random noise voltage, thus continuously varying the repetition rate of the timing pulses generated by the synchronizer, the synchroscopes 19 and 20 would be generating time bases at the repetition rate established by the timing pulses delayed by the proper equivalent range time interval established by the delay circuit 21 and 22. Since the sweep or time base waveforms generated on the indicator of the synchroscope must be synchronized with the transmitted pulses generated by transmitter 13 to present stationary target images that is, a deflection of the time base having the same time relationship with the transmitted pulses for a plurality of repetition cycles, transmitted pulses and reflected echoes generated subsequent to the time base initiating pulses on the synchroscopes 19 and 20 within a given delay interval of delay circuit 21 and 22 will appear as moving target deflections on the indicators of the synchroscope 19 and 20, since their repetition rate is different from that of the time base of the synchroscopes. Consequently, only echoes returning from the proper transmitted pulse and thus of targets in the proper range segment will appear as stationary targets on the scope screens of the synchroscope 19 and 20, while all other echoes from improper range segments will appear as moving background targets similar to noise deflections experienced on present radar indicators as shown in Fig. 2.

This repetition rate discriminating feature permits a very high repetition rate to be employed with the radar since pulses and echoes at improper repetition rate are discriminated against in the multiple indicators, thus permitting a large number of pulses to be transmitted to and received from any given target, and achieving the desired integrating effect in the indicator.

Also a high rate of scan of the antenna may be effected, since the high pulse repetition frequency of the radar decreases the danger of skipping many regions in space in a scanning cycle. This system also gives the added possibility of high target resolution and rapid scanning without range limitation.

Referring again to Fig. 2, a typical installation embodying the instant invention might have indicator ranges of zero–10 miles, 10–20 miles, 20–30 miles, 30–40 miles, etc., out as far as desired in range. The range sector, 0–10 miles, would key the first synchroscope off of the transmitter pulse without delay. The range segment, 10–20 miles, would key off of the transmitter pulse through a delay line or delay multivibrator of 120 microseconds, thereby only on the next succeeding cycle of operation would the echoes from the preceding transmitted pulse be stationary on the scope. Ranges 20–30 miles would work in the same manner. The frequency modulation of the repetition rate would prevent undesirable echoes from appearing stationary thus smearing across the screen as a low level, fuzzy background. High resolution, back bias or short time constant automatic volume control to reduce the amplitude of the echoes from nearby objects, and long persistence cathode-ray tube screens, would prevent serious interference from echoes of other of the proper range segments.

Various modifications may be made in the invention without departing from the spirit or scope thereof, and it is desired therefore that only such limitations shall be placed thereon as are imposed by the prior art and are set forth in the appended claims.

The invention described herein may be manufactured and used by or for the Government of the United States of America for governmental purposes without the payment of any royalties thereon or therefor.

What is claimed is:

1. In a radar system, transmitter means for generating short duration radiation pulses, receiver means for receiving return signals resulting from said pulses, frequency modulated timing means coupled to said transmitter for controlling the repetition frequency of same, a plurality of indicator means coupled to said timing means and said receiver to produce a visual indication of said transmitted and received pulses, each operative to display a particular range segment, delay means coupled between each of said indicators and said timing means to delay the cycle initiation of said indicators relative to the initiation of each corresponding radiation pulse whereby said indicators produce a stationary image of return signals generated only in the range segment determined by the delay associated with that indicator.

2. In a radar system, transmitter means for generating short duration radiation pulses, receiving means for receiving return signals resulting from said pulses, frequency modulated timing means coupled to said transmitter means to control the repetition frequency of same, and cathode ray tube indicator means coupled to said timing means and said receiver to produce a visual indication of said transmitted and received pulses, said indicator means comprising a plurality of visual time base generating means, means coupling said receiver to said cathode ray tube means whereby the beam of said cathode ray tube indicator means is deflected vertically when pulses are received, means coupling said timing means with said generating means whereby said time bases are in isochronism with said transmitted pulses, said last named means including delay means coupling the output of said timing means to predetermined ones of said time base generating means whereby the cycle initiation of the time bases generated by said predetermined ones of said generating means is delayed a predetermined amount after the transmission of each corresponding radiation pulse whereby the respective time bases produced by said generating means are responsive only to return signals from a particular range segment.

3. In a high pulse repetition frequency, rapid scan radar system, the combination as recited in claim 2, wherein each of said time base generating means is operative to display a different given range segment, the output of said timing means being coupled directly to one of said time bases generating means, and separate delay means for use with each of the remaining of said time base generating means coupled with each of said time base generating means in series with the output of said timing means whereby the cycle of initiation of each of said generating means is delayed a range discriminating amount relative to initiation of said radiation pulses.

4. In a high pulse repetition frequency, rapid scan radar system, transmitter means for generating short duration radiation pulses, receiver means for receiving return signals resulting from said transmitted pulses, frequency modulated timing means coupled to said transmitter to control the repetition frequency of same, and indicator means coupled to said timing means and said receiver to produce a visual indication of said transmitted and received pulses, said indicator means comprising a plurality of cathode ray oscilloscopes, time base generating means associated with each of said oscilloscopes, means coupling the output of said receiver to each of said oscilloscopes whereby the beam of said cathode ray tube oscilloscopes is deflected vertically when pulses are received, means coupling one of said time base generators directly to said timing means to isochronize said generator with said transmitter, and delay means coupling the remaining time base generators in series to said timing means to delay the cycle initiation of the remaining of said time base generators a predetermined amount after the transmission of corresponding radiation pulses whereby said generators and their associated oscilloscopes are rendered responsive only to return signals from a particular range segment.

5. In a high repetition frequency, rapid scan radar system, transmitter means for generating short duration radiation pulses, receiver means for receiving return signals resulting from said pulses, frequency modulated timing means coupled to said transmitter means generating timing pulses to control the repetition frequency of same, and indicator means coupled to said timing means and said receiver to produce a visual indication of said transmitted and received pulses, said indicator means comprising a plurality of cathode ray oscilloscopes, time base generator means associated with each of said oscilloscopes, means coupling the output of said receiver to each of said oscilloscopes whereby the beams of said cathode ray oscilloscopes are deflected vertically when radiation pulses are received, each of said oscilloscopes and their associated time base generators being operative to indicate targets in a given range segment, the timing pulses generated by said timing means being coupled directly to one of said time base generator means, and separate delay means for use with each of remaining of said time base generators coupled to each of said associated generators in series to the output of said timing means whereby said timing pulses are delayed a range discriminating amount to each of said time base generators to isochronize said time base generators with said transmitter in predetermined delay relationships determined by the range segment of each oscilloscope.

6. A radar system comprising a pulse transmitter means, a first means coupled to said transmitter for progressively and continually varying the pulse repetition rate of said transmitter means, a receiver means, a plurality of cathode ray tube indicators having a signal indicating means and a beam deflection means, separate sweep generator means coupled to the beam deflection means of each of said cathode ray tube indicators operative only when in a quiescent condition to initiate a respective sweep locus in response to timing pulses fed thereto which are in isochronism with the pulses transmitted by said transmitter means, second means coupled to one of said sweep generator means for feeding said timing pulse thereto, third means coupled to said last named means and to the other sweep generator means for delaying said timing pulses a different amount for each of said other sweep generator means whereby the sweep locus of each cathode ray indicator represents a different range segment, coupling means connected between said receiving means and the signal indicating means of each cathode ray tube indicator whereby the only pulses which remain stationary on the faces of said respective cathode ray tube indicators are those of the corresponding range segments.

7. A radar system comprising a pulse transmitter means, a timing circuit for randomly varying the pulse repetition rate of said transmitter means, receiver means, a plurality of cathode ray tube indicators having signal indicating means and beam deflection means, separate sweep generator means coupled to the beam deflection means of each of said cathode ray tube indicators operable in response to the receipt of timing pulses fed thereto to initiate respective sweep time bases in isochronism with the transmitted pulse period, signal coupling means feeding the output of said timing circuit directly to one of said sweep generators and to each of the other sweep generators in delayed sequence so that the sweep time base of each of the cathode ray tube indicators represents a different range segment, and means feeding the output of said receiver means in parallel to the signal indicating means of each of said cathode ray tube indicators.

References Cited in the file of this patent

UNITED STATES PATENTS

| | | |
|---|---|---|
| 2,405,239 | Seeley | Aug. 6, 1946 |
| 2,415,095 | Varian | Feb. 4, 1947 |
| 2,426,989 | De Rosa | Sept. 9, 1947 |
| 2,452,598 | Page | Nov. 2, 1948 |
| 2,454,782 | De Rosa | Nov. 30, 1948 |
| 2,471,408 | Busignies | May 31, 1949 |
| 2,485,583 | Ginzton | Oct. 25, 1949 |
| 2,524,987 | Mesa | Oct. 10, 1950 |

FOREIGN PATENTS

| | | |
|---|---|---|
| 552,072 | Great Britain | Mar. 22, 1943 |